United States Patent [19]

Naedler

[11] Patent Number: 5,769,979
[45] Date of Patent: Jun. 23, 1998

[54] ROTARY AIR CONNECTION FOR TIRE INFLATION SYSTEM

[75] Inventor: Mark Henry Naedler, San Antonio, Tex.

[73] Assignee: Equalaire Systems, Inc., Corpus Christi, Tex.

[21] Appl. No.: 706,080

[22] Filed: Aug. 30, 1996

[51] Int. Cl.[6] .................................................. B60C 23/00
[52] U.S. Cl. ............................................................ 152/417
[58] Field of Search .................................... 152/417, 415, 152/416

[56] References Cited

U.S. PATENT DOCUMENTS

| | | | |
|---|---|---|---|
| 1,072,907 | 9/1913 | Brooks | 152/417 X |
| 1,083,847 | 1/1914 | McDowell et al. | 152/417 |
| 1,112,596 | 10/1914 | Burggraf, Jr. | 152/417 |
| 1,165,057 | 12/1915 | Bayly | 152/417 |
| 1,205,504 | 12/1916 | Bearce | 152/417 |
| 3,276,503 | 10/1966 | Kilmarx | 152/415 |
| 4,387,931 | 6/1983 | Bland | 152/415 |
| 4,685,501 | 8/1987 | Williams | 152/415 |
| 4,883,106 | 11/1989 | Schulz et al. | 152/415 |
| 5,584,949 | 12/1996 | Ingram | 152/415 |

*Primary Examiner*—Francis J. Lorin
*Attorney, Agent, or Firm*—Fulbright & Jaworski

[57] ABSTRACT

A rotary air connection in a central tire inflation system for supplying air to the rotating tires which includes a union having a stationary part having an internal shoulder with a rotary seal and a second rotatable part including an elongate rigid tubular member coaxially extendable through and longitudinally movable in the stationary part and the rotary seal. The tubular member is sealingly connected to a hub cap thereby providing a structure allowing for movement and misalignment between the movable and stationary parts for the union.

6 Claims, 4 Drawing Sheets

ROTARY AIR CONNECTION FOR TIRE INFLATION SYSTEM

BACKGROUND OF THE PRESENT INVENTION

The present invention is directed to an improvement in an automatic central tire inflation system (ATIS) in which the air in rotating tires is controlled through an air connection between an air supply and each of the tires. In particular, the present invention is directed to an improved rotary air connection for a tire inflation system.

It is known, as disclosed in U.S. patent application Ser. No. 08/385,504, entitled Air Inflation System for Trailer Vehicles, now U.S. Pat. No. 5,584,949 to provide a pneumatic rotary union in a central tire inflation system for connecting an air supply to each of the rotating tires. In such a system, a rotatable union was provided with a T-connection and plastic lines and, while satisfactory, had the disadvantages of being expensive, requiring a hub cap extension for the necessary housing space, increases the number of possible leak points in the air system, and requires considerable time for installation.

The present improved rotary air connection is advantageous in that it is less expensive, does not require hub cap extensions, but is universally usable on most types of hub caps, is easy to install, and has less leak points.

Furthermore, the manufacturing tolerances in vehicle wheels are variable, both in distances and in out-of-round measurements, and consequently cause extensive wear and stress on rotary air connections. The present improved rotary air connection allows for misalignment and movement between the rotating and the stationary parts of the air connection.

SUMMARY

The present invention is directed to a rotary air connection in an air inflation system for a trailer in which the connection requires less space and can be universally used with various types of hub caps without requiring a hub extension, has few leak points, is easy to install, is inexpensive, and which compensates for misalignment between the movable and stationary members of the connection during rotation.

A further object of the present invention is the improvement in an air inflation system for a vehicle trailer having at least one axle with at least one wheel having a pneumatic tire at each end of the axle and the trailer having an air supply supplying air to the inside of the axle and a lubrication hub cap at each end of the axle for lubricating the wheel bearings of a rotary air connection for supplying air to the rotating tires.

The air connection includes a pneumatic rotary union supported and positioned in the center of each end of the axle. The union includes a first stationary part having first and second ends with an internal shoulder therebetween having a passageway through the shoulder in communication with the air supply. A stationary rotary seal is supported from the shoulder and encircles the passageway. The union includes a second rotatable part including an elongate rigid tubular member having first and second ends with the second end coaxially extendable through and longitudinally movable in the first end of the stationary part, the passageway, and sealably engaging the rotary seal. The first end of the tubular member is sealingly connected to the hub cap.

A further object of the present invention is including a sealing connection between the first end of the tubular member and the hub cap allowing movement between the first end of the tubular member and the cap for compensating for misalignment between the rotatable cap and the stationary part of the union.

Yet a further object of the present invention is wherein the tubular member is a rigid metal member. In a further embodiment, the tubular member may be an L-shaped or straight member.

A further object is wherein the stationary part includes a circular bushing chamber extending outwardly of the first end of the stationary part, and a bushing connected to the exterior of the tubular member and the bushing is coaxially movable into and out of said bushing and chamber and is rotatable therein.

Yet a still further object of the present invention is wherein the bushing has a diameter and a longitudinal extent greater than a diameter and longitudinal extent of the rotary seal.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
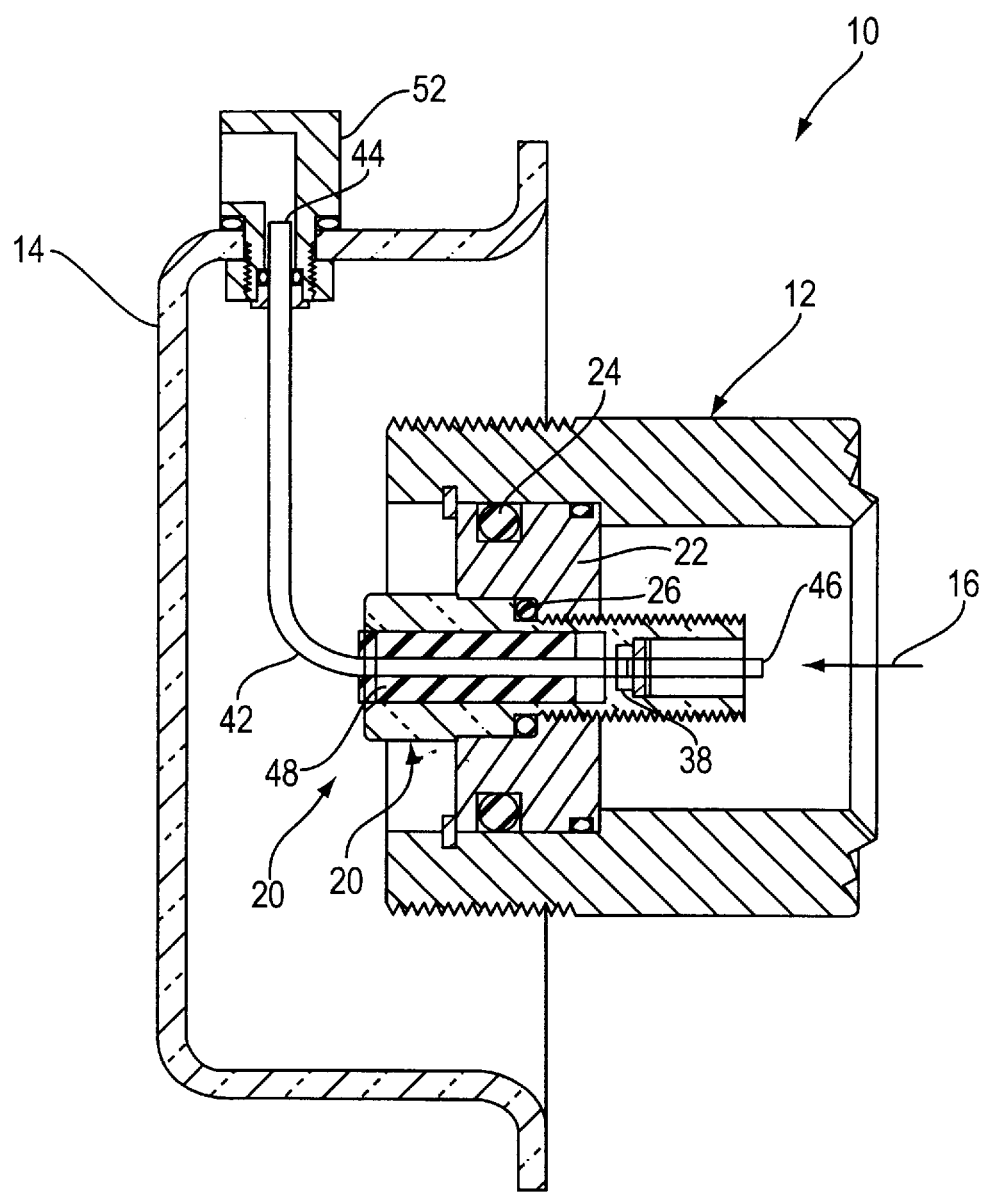
FIG. 1 is an elevational view, in cross section, of the rotary air connection of the present invention in a central tire inflation system.
Figure 2:
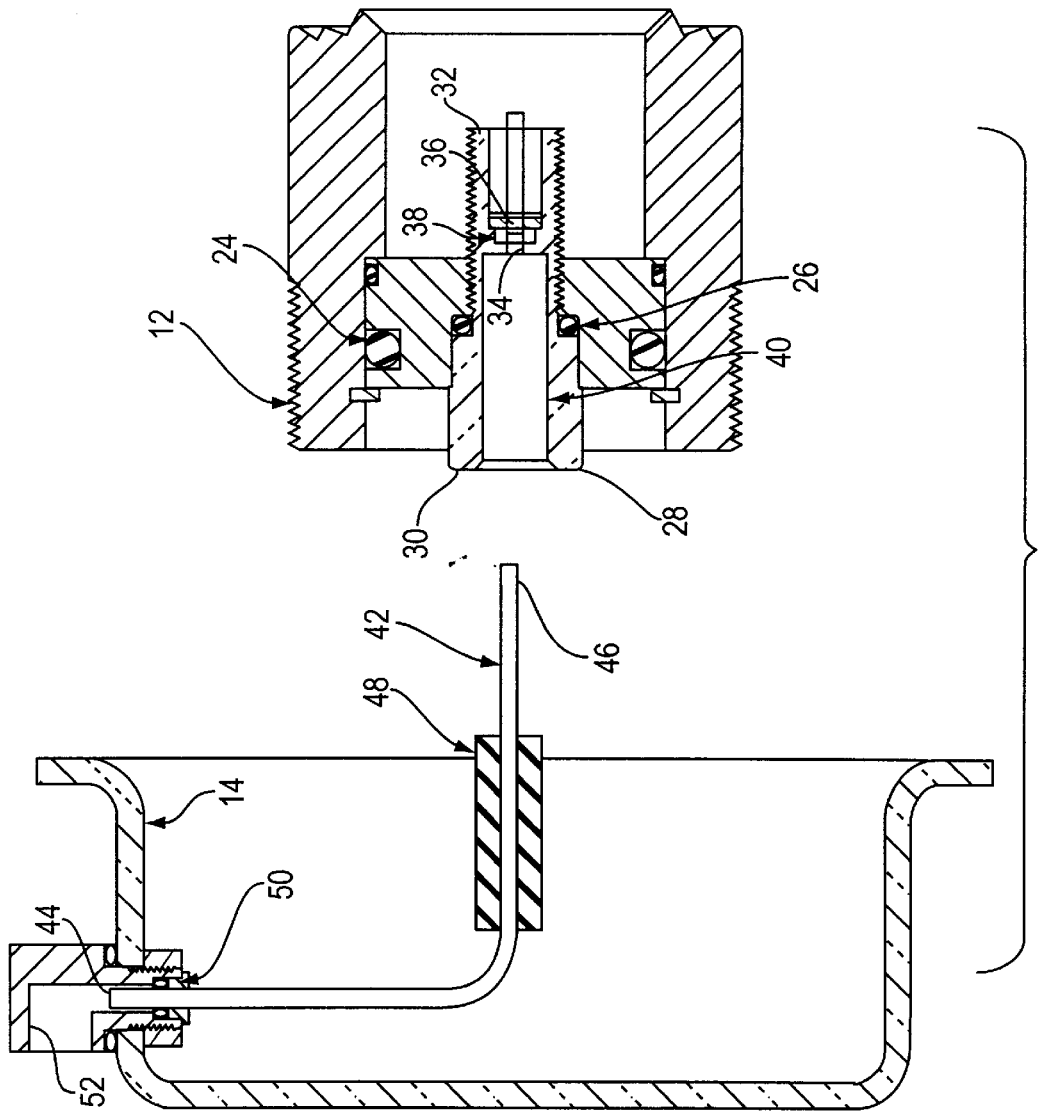
FIG. 2 is an exploded view similar to FIG. 1 in which the air connection is shown in separate parts.

Referring now to FIGS. 1 and 2, the reference numeral 10 generally indicates the rotary air connection of the present invention for supplying air from an air supply on a truck trailer in a central tire inflation system for a vehicle to the rotating tires. The numeral 12 generally indicates one axle or spindle of a trailer having a plurality of axles with wheels having one or more tires at one end, a hub cap 14 at each end of the axle 12 for retaining lubricate in the wheel bearings, and an air supply 16 supplying air to the inside of the axle 12, all as described in U.S. patent application Ser. No. 08/385,504 entitled Air Inflation System for Trailer Axles, now U.S. Pat. No. 5,584,949, which for a fuller disclosure is incorporated herein by reference.

A pneumatic rotary union generally indicated by the reference numeral 20 is supported and positioned in the center of each end of the axle 12, such as in a plug 22, which sealingly engages the interior of the axle 12 by a seal 24, and in turn is sealed from the exterior of the rotary union 20 by a seal 26.

Referring still to FIGS. 1 and 2, the union 20 has a first stationary part 28 having a first end 30 and a second end 32 with an internal shoulder 34 between the first end 30 and the second end 32 having a passageway 36 through the shoulder 34. The passageway 36 is in communication with the air supply 16 inside of the axle 12. A stationary rotary seal 38 is supported from the shoulder and encircles the passageway 36. The rotary seal is preferably a lip-tight seal and any suitable material, such as NITRILE, is satisfactory. In addition, the stationary part 28 includes a circular bushing chamber 40, extending outwardly of the first end 30 of the stationary part 28.

The union 20 includes a second rotatable part including an elongate rigid tubular member 42, preferably metal, having a first end 44, and a second end 46. The second end is coaxially extendable through and is longitudinally movable in the first end 30 of the stationary part 28, the passageway 36, and the exterior of the second end 46 sealably engages the rotary seal when installed and thus the second end 36, as best seen in FIG. 1, is in communication with the air 16 in the inside of the axle 12. A bushing 48 is connected to the exterior of the tubular member 42, and is coaxially movable into and out of the bushing chamber 40, and is rotatable therein. The first end 44 of the tubular member 42 is sealingly connected to the hub cap 14 through a floating seal 50. The seal 50 may be any suitable dynamics seal allowing axial movement of end 44, such as a lip seal or O-ring seal. An air connection 52 is provided on the hub cap 14 for connection to the tire or tires at the end of the axle 12.

In operation, air 16 is supplied to the interior of the axle 12, and to the stationary part 28 of the rotary union 20. The hub cap 14, which may contain a lubricant, such as oil or grease, for lubricating the wheel bearings rotates with the wheels along with the tubular member 42. It is to be noted that the rotary connection 20 is easily assembled and disassembled for repair, as the tubular 42 and bushing 48 need only be longitudinally inserted into and retracted from the stationary first part 28. Furthermore, the longitudinal position of the tubular member 42 and bushing 48 in the first part 28 is not critical but in fact is longitudinally movable at all times to compensate for misalignment and movement between the hub cap 14 and the axle 12. Furthermore, the present improved rotary connection 20 can universally be used with all types of hub caps 14 by merely suitably positioning the air connection 52 and therefore does not require any hub extensions as in the prior art. In addition, the rotary connection 20 includes only two seal points, these being seals 38 and 50, and thereby reduce the number of leak points in the connection 10.

In the embodiment shown in FIGS. 1 and 2, the tubular member 42 is L-shaped and the first end 44 is longitudinally movable and slidable in the seal 50 whereby the sealing connection allows movement between the first end 44 of the tubular member 42 and the cap 44 compensating for any misalignment between the rotatable cap 14 and the stationary part 28 of the union.

Since the rotary seal 38 is positioned on the internal shoulder 34, and seals around the exterior of the end 46 of the tubular member 42, it is therefore a small sealing surface and more capable of sealing under high rotational speeds of the tubular member 42. On the other hand, the bushing 48, such as a nylon bushing, has an axial extent much greater than the axial extent of the seal 38, and has a larger external diameter than the internal diameter of the rotary seal 38. The purpose of the bushing 48 is not sealing, but is of a size for load carrying and allows various coaxial longitudinal positions in the chamber 40 to be accommodated thereby compensating for differences in structure, misalignment and allowing movement between the rotating parts and the stationary parts of the connection 10.

Figure 3:
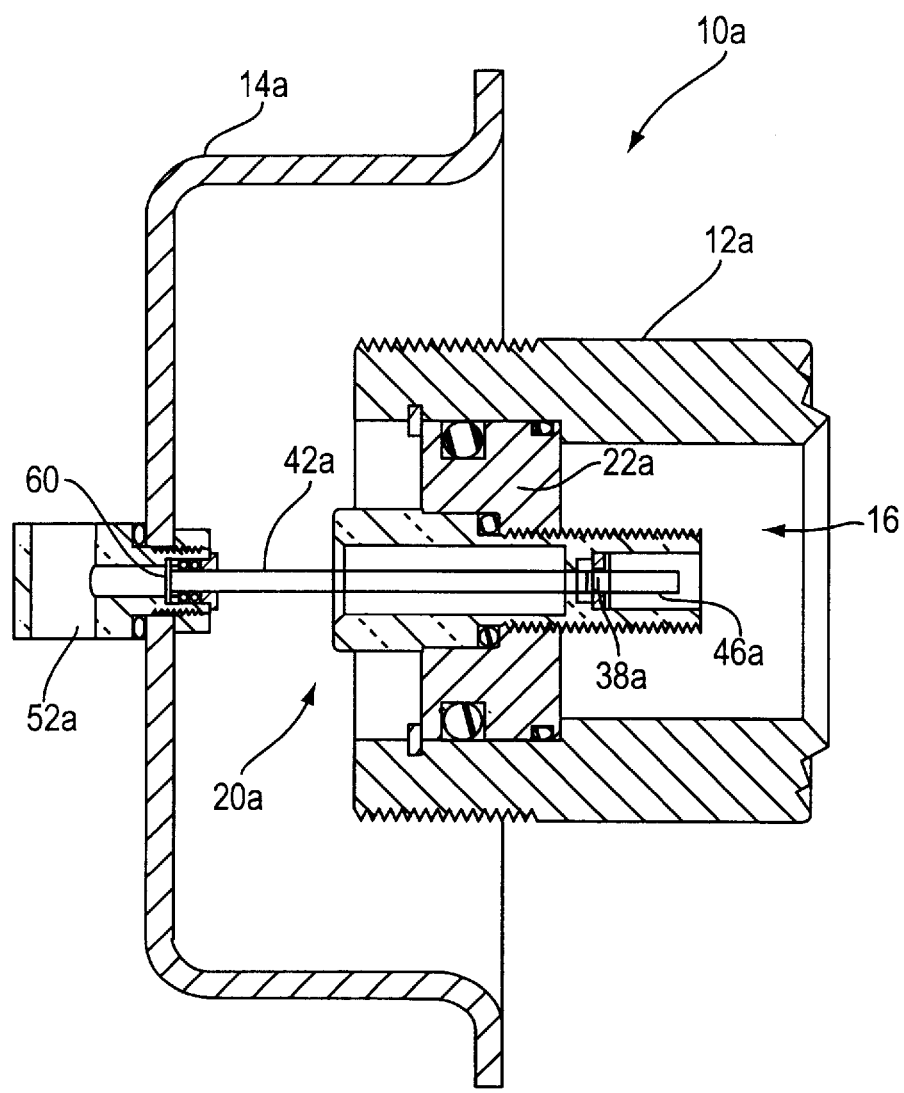
FIG. 3 is an elevational view, in cross section, of another embodiment of the rotary air connection of the present invention.
Figure 4:
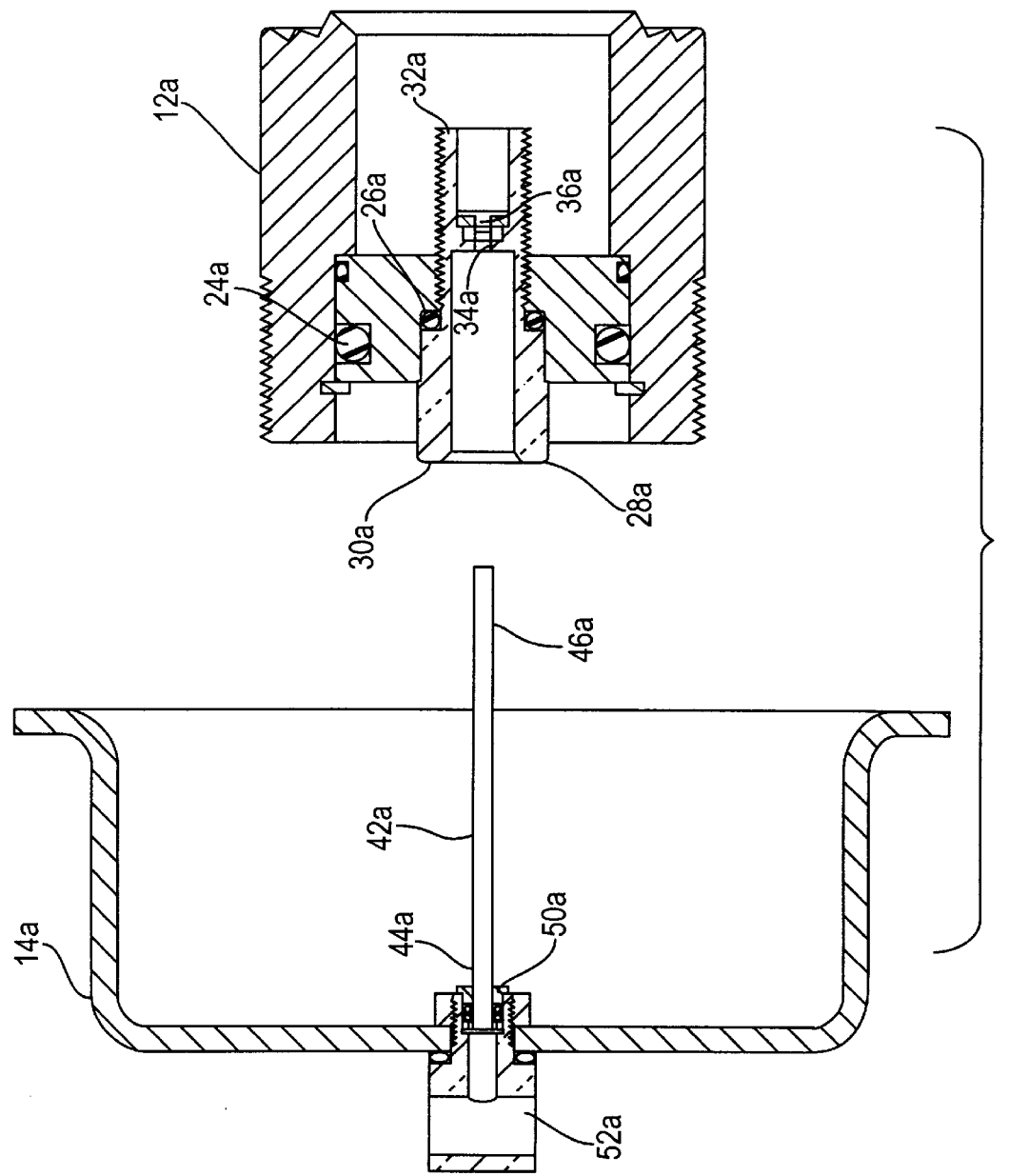
FIG. 4 is an exploded view of FIG. 3.

Other and further embodiments may be provided, such as shown in FIGS. 3 and 4, where like parts to those shown in FIGS. 1 and 2 are similarly numbered with the addition of the suffix "a". The rotary air connection 10a is advantageous in that it is simpler than the embodiment of FIGS. 1 and 2 by having a straight tubular member 42a and does not require a bushing. This embodiment has the same advantages of being inexpensive, does not require a hub cap extension, has only two possible leak points, is easy to install, and compensates for misalignment and movement between the rotating and stationary parts of the coupling 20a. Preferably, the tubular member 42a has at end 44a a shoulder 60 for limiting longitudinal movement of the end 44a relative to the hub cap 14a.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts will be readily apparent to those skilled in the art and which are encompassed within the spirit of the invention and the scope of the appended claims.

What is claimed is:

1. In an air inflation system for a vehicle having at least one axle with at least one wheel having a pneumatic tire at each end of the axle and said vehicle having an air supply supplying air to the inside of the axle and a hub cap at each end of the axle, the improvement in a rotary air connection for supplying air to the rotating tires comprising, a hollow tubular member able to serve as a conduit for pressurized air having a first and second end, a circular first resilient seal generally coaxial with the axle, a sealable connection between the second end of the said hollow member and the first seal creating sealed communication between the air supply inside the axle and the interior of the said hollow member, a circular resilient second seal generally coaxial with the hub cap, a sealable connection between the first end of the said hollow member and the second seal creating sealed communication between a pressure conduit which rotates with the said hub cap and the interior of the said hollow member, said hollow member is positioned between the first and second seals so that during rotation of the hub cap in relation to the said axle when the hub cap is not perfectly centered with the axle the ends of the hollow member are free to pivot in the resilient seals and compensate for any misalignment.

2. The apparatus of claim 1 wherein the tubular member is a straight member.

3. The apparatus of claim 2 wherein the tubular member is supported solely by the first and second resilient seals.

4. The apparatus of claim 3 wherein the tubular member is a straight member.

5. The apparatus of claim 4 wherein the tubular member is supported solely by the first and second resilient seals.

6. In an inflation system for a vehicle having at least one axle with at least one wheel having a pneumatic tire at each end of the axle and said vehicle having an air supply supplying air to the inside of the axle and a hub cap at each end of the axle, the improvement in a rotary air connection for supplying air to the rotating tires comprising, a pneumatic rotary union supported and positioned in the center of each end of the axle, said union having a first stationary part having first and second ends and having a passageway therethrough, said passageway being in communication with the air inside of the axle, and a first resilient seal supported in the passageway between the first and second ends, said union having a second rotatable part including an elongate rigid tubular member having first and second ends, said second end coaxially extendable through and longitudinally movable in and retractable from the first end of the stationary part, the passageway and sealably engages the first seal, the first end of the tubular member extendable through and longitudinally movable through a second resilient seal in the hub cap whereby the first end of the tubular member is in communication with the air, and whereby the rotary air connection allows for misalignment between the rotating and stationary parts of the air connection.

* * * * *